(12) United States Patent
Ivanov et al.

(10) Patent No.: US 6,911,995 B2
(45) Date of Patent: Jun. 28, 2005

(54) COMPUTER VISION DEPTH SEGMENTATION USING VIRTUAL SURFACE

(75) Inventors: Yuri A. Ivanov, Cambridge, MA (US); Alex P. Pentland, Lexington, MA (US); Christopher R. Wren, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 626 days.

(21) Appl. No.: 09/954,770

(22) Filed: Sep. 18, 2001

(65) Prior Publication Data

US 2003/0038875 A1 Feb. 27, 2003

Related U.S. Application Data

(60) Provisional application No. 60/313,172, filed on Aug. 17, 2001.

(51) Int. Cl.[7] .............................................. H04N 13/00
(52) U.S. Cl. ............................. 348/42; 348/36; 348/47; 348/135; 348/141; 348/169; 348/154; 348/145; 382/174; 382/115; 382/173
(58) Field of Search .............................. 348/42, 36, 47, 348/154, 155, 135, 141, 169, 145; 382/115, 174, 173, 106, 103, 154

(56) References Cited

U.S. PATENT DOCUMENTS

| | | | | |
|---|---|---|---|---|
| 5,473,364 A | * | 12/1995 | Burt | ............................ 348/47 |
| 6,141,104 A | * | 10/2000 | Schulz et al. | ................ 356/616 |
| 6,144,701 A | * | 11/2000 | Chiang et al. | ............... 375/240 |
| 6,297,825 B1 | * | 10/2001 | Madden et al. | .............. 345/419 |
| 6,507,665 B1 | * | 1/2003 | Cahill et al. | ................. 382/154 |
| 6,677,982 B1 | * | 1/2004 | Chen et al. | .................... 348/36 |
| 6,700,999 B1 | * | 3/2004 | Yang | ........................... 382/118 |

OTHER PUBLICATIONS

Ivanov et al., in *"Fast lighting independent background subtraction,"* International Journal of Computer Vision, 37(2) :199–207, 2000.

Gaspar et al., in *"Ground plane obstacle detection with a stereo vision system,"* International workshop on Intellignet Robotic Systems, ISR94, 1994.

* cited by examiner

*Primary Examiner*—Shawn S. An
(74) *Attorney, Agent, or Firm*—Dirk Drinkman; Andrew V. Curtin

(57) ABSTRACT

The location of an object in a physical scene is identified with a stereo camera. A virtual surface is identified in the physical scene, and an approximate disparity set is constructed for the virtual surface. A main and a reference image of the scene are acquired by the stereo camera. The reference image is warped according to the disparity set, and subtracted from the main image to determine a set of depth residual values. Pixels having a substantially non-zero residual are identified with a surface of the object not coincident with the virtual surface.

12 Claims, 6 Drawing Sheets

COMPUTER VISION DEPTH SEGMENTATION USING VIRTUAL SURFACE

This application claims the benefit of Provisional Application No. 60/313,172, filed Aug. 17, 2001.

FIELD OF THE INVENTION

The present invention relates generally to the field of video analysis, and more particularly to segmenting depths in scenes observed by stereo video cameras.

BACKGROUND OF THE INVENTION

The increasing availability of inexpensive video cameras and high-quality projection displays is providing opportunities for developing novel interfaces that use computer vision. These interfaces enable interactive applications that impose little constraint on a user and the environment. For example, the user can interact with objects in a scene without the need for a physical coupling between the user, the objects, and a computer system, as in more conventional mouse, or touch-based computer interfaces.

However, computer vision systems, with rare exceptions, are difficult to implement for applications where the visual appearance of objects and the scene change rapidly due to lighting fluctuations. Under dynamic lighting, traditional segmentation techniques generally fail.

The difficulty of implementation increases for interactive applications that use front-projected or rear-projected displays because the projector will illuminate foreground objects as well as the background. This makes color tracking and other appearance-based methods difficult, if not impossible to use.

By utilizing calibrated stereo cameras, it is possible to take advantage of 3-dimensional geometric constraints in the background to segment the scene using stereo analysis. Indeed, if the geometry of the background is known, then it becomes possible to determine a depth at every pixel in pairs of images, and compare these depths to the depths in images of a scene with static geometry, i.e., a scene without moving foreground objects. However, this process involves computing a dense depth map for each pair of images acquired by the stereo camera. This is computationally time consuming, and therefore unsuitable for applications that demand real-time performance.

Many prior art computer vision systems used for object recognition and motion analysis begin with some form of segmentation, see for example Friedman et al. "Image segmentation in video sequences: A probabilistic approach," Thirteenth Conference on Uncertainty in Artificial Intelligence, 1997, Stauffer et al. "Adaptive background mixture models for real-time tracking," Proc. of CVPR-99, pages 246–252, 1999, and Wren et al. "Pfinder: Real-time tracking of the human body," IEEE Trans. on Pattern Analysis and Machine Intelligence, 19(7):780–785, 1997.

Typically, a real, tangible, physical background surface is measured over an extended period of time, and a 3D model is constructed using statistical properties of the measurements. The model is then used to determine which pixels in an input image are not part of the background, and therefore must be foreground pixels. Obviously, the background in the scene must remain relatively static for the segmentation to work, or at most, vary slowly with respect to geometry, reflectance, and illumination. For many practical applications that require natural interactions and natural user environments, these constraints are too restrictive.

Reliable segmentation for outdoor environments with a static geometry can be performed by using an explicit illumination model, see Oliver et al. "A Bayesian computer vision system for modeling human interactions," Proceedings of ICVS99, 1999. There, the model is an eigenspace of images that describes a range of appearances in the scene under a variety of illumination conditions. Any different and unknown illumination dramatically degrades performance of the system, should it work at all. None of the above techniques accommodate rapidly changing lighting conditions, such as one would get when illuminating background and foreground objects with a dynamic, high-contrast projection display device.

Another class of prior art techniques take advantage of the geometry in the scene. For example, Gaspar et al., in "Ground plane obstacle detection with a stereo vision system," International workshop on Intelligent Robotic Systems, 1994, describe constraints of a ground plane in order to detect obstacles in the path of a mobile robot.

Other methods employ special purpose multi-baseline stereo hardware to compute dense depth maps in real-time, see Okutomi et al. "A multiple-baseline stereo," IEEE Trans. on Pattern Analysis and Machine Intelligence, 15(4):353–363, 1993. Provided with background disparity values, their method performs real-time depth segmentation, or "z-keying," provided that the background does not vary, see Kanade "A stereo machine for video-rate dense depth mapping and its new applications," In Proc. of Image Understanding Workshop, pages 805–811, 1995. However, the burden of computing dense, robust, real-time stereo maps is great.

Ivanov et al., in "Fast lighting independent background subtraction," International Journal of Computer Vision, 37(2):199–207, 2000, describe a segmentation method that first illuminates a physical background surface using a laser pointer. The location of the laser spot in stereo images is used to construct a sparse disparity map of the geometrically static, physical background surface. They use Delaunay triangulation to estimate neighborhood relationships anywhere in the 3D mesh. The disparity map is used to segment a foreground object from the background in real-time. As an advantage, a dense depth map is never explicitly computed. Instead, the pre-computed disparity map is used to rectify input images prior to direct image subtraction.

As a disadvantage, their method requires a time consuming measurement step with the laser pointer while stereo images are collected. This requires specialized equipment, and is error prone. Because the disparity map is modeled in the form of flat triangles, the method requires a high degree of human intervention when the surface is highly curved or otherwise irregular. In this case a sparse set of calibration points is insufficient because interpolation is ineffective in many areas.

In addition, their system requires a background surface that reflects laser light. This means that their method cannot be used to define virtual surfaces. Hereinafter, the term virtual surface means a surface that is geometrically defined in the real world and that is either tangible, i.e., a surface of a physical object, or some imaginary plane in space, not necessarily tangible, or only partially tangible.

This means their method cannot work for detecting objects in thin air, for example, a person entering through the virtual plane of an open doorway, or a ball falling through the virtual plane defined by a hoop. Nor, can their system deal with objects appearing from behind the background surface.

Moreover, their laser scanning is only practical for indoor scenes, and quite unsuitable for large scale outdoor scenes where it is desired to define depth planes geometrically, that in fact do not exist as tangible objects. Therefore, there still is a need for a robust depth segmentation technique that can operate in real-time on tangible and virtual surfaces in the physical world, at arbitrary scales.

SUMMARY OF THE INVENTION

The present invention provides a system and method for segmenting a video of a scene so that various depths can be detected. The segmentation is insensitive to variations in lighting in the scene, and operates in real-time. A stereo camera is used to acquire a video of the scene. A disparity map for the scene is determined analytically. The disparity map is then used to detect regions in the scene that are not at predetermined depths.

More particularly, the invention facilitates identifying a location of an object in a physical scene with a stereo camera. A virtual surface is identified in the physical scene, and an approximate disparity set is constructed for the virtual surface. The stereo camera then acquires a main and a reference image of the scene. The reference image is warped according to the disparity set, and the warped image is subtracted from the main image to determine depth residuals of pixels in the main image. Pixels having a substantially non-zero residual are identified as lying on a surface of the object not coincident with the virtual surface. The decision threshold is set according to the level of noise in the images.

Furthermore, the invention may utilize an inherent thickness of the virtual surface, which called a virtual surface margin, to combine these virtual surfaces into detection volumes as well as more complex computational structures. As a practical application, two such surfaces can be used to instantaneously detect contact between a foreground object, e.g., a pointer such as a finger, and a geometrically static background, e.g., a display surface. Due to the geometric nature of the segmentation, the detection of the touching is invariant to lighting, color, and motion in the scene, making the invention suitable for operations that require robust performance. The invention is therefore particularly applicable to interactive front- and back-projected displays.

DETAILED DESCRIPTION OF THE PREFERRED EMBODIMENT

System Structure

Figure 1:
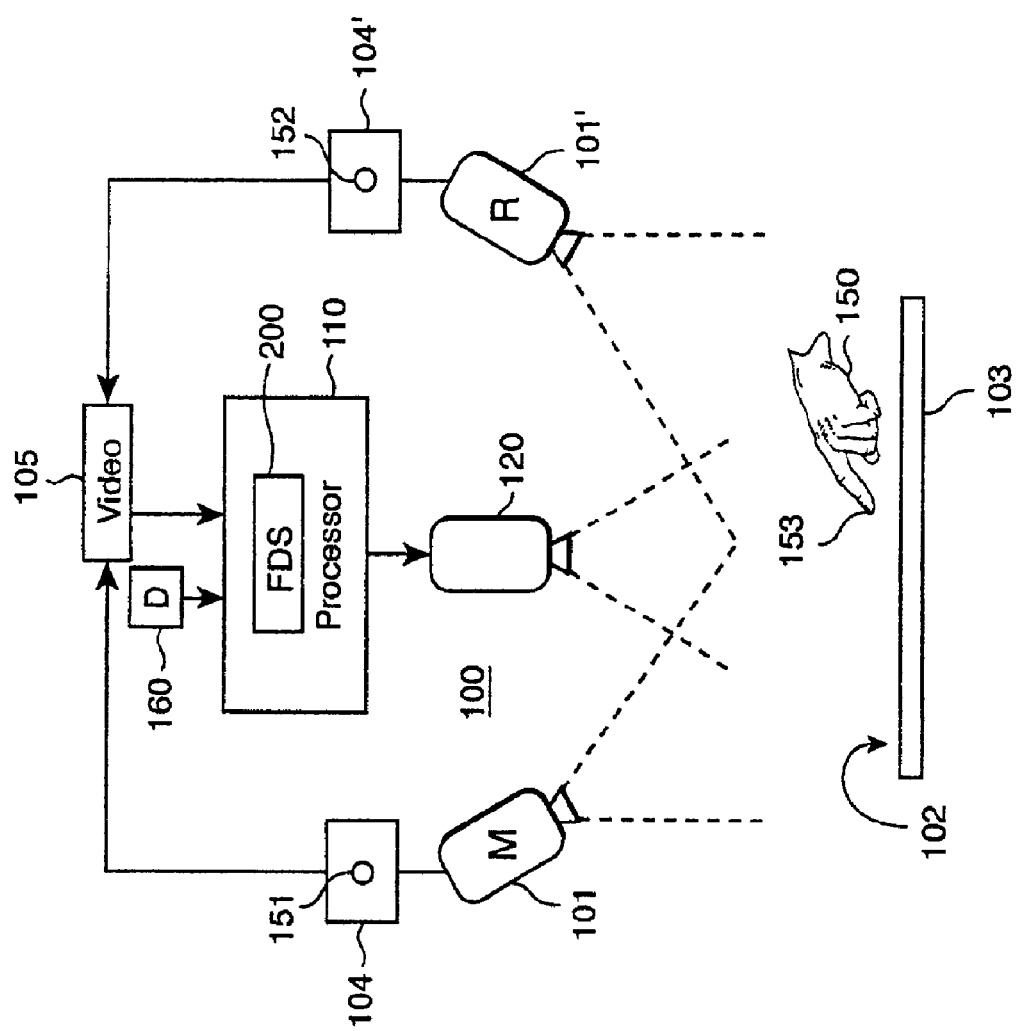
FIG. 1 is a block diagram of a depth segmentation system according to the invention.

FIG. 1 shows a depth segmentation system 100 according to our invention. Our system 100 includes a pair of stereo cameras 101–101', respectively a main camera M, and a reference camera R, aimed at a scene 102. The scene 102 includes a background object 103, for example, a table top or a game-board, and a foreground object 150, for example, a pointer or a game piece. The cameras 101–101' acquire pairs of images 104–104' that form a stereo video 105. The video 105 is analyzed by a processor 110.

The processor 110 is substantially conventional, including a microprocessor, memory, and I/O interfaces and devices, coupled to each other. The microprocessor executes operating system programs, and application programs implementing a fast depth segmentation (FDS) method 200 according to our invention, as described in greater detail below with reference to FIG. 2. The system 100 can also include a projector 120 to illuminate the scene 102 with dynamically varying images.

System Operation

To estimate stereo disparity at a pixel location (x, y) 151 in the main image 104, it is necessary to locate the corresponding pixel ($x^r$, $y^r$) 152 in reference image 104'. An estimated stereo depth disparity d(x, y) is a difference between these two pixel locations:

$$d(x, y) = \begin{bmatrix} x^r - x \\ y^r - y \end{bmatrix}. \tag{1}$$

The depth disparity is used to estimate a depth to a location 153, for example, the top surface of a finger in the scene 102, corresponding to pixel (x, y) in the main image and pixel ($x^r$, $y^r$) in the reference image.

Method Overview

Figure 2:
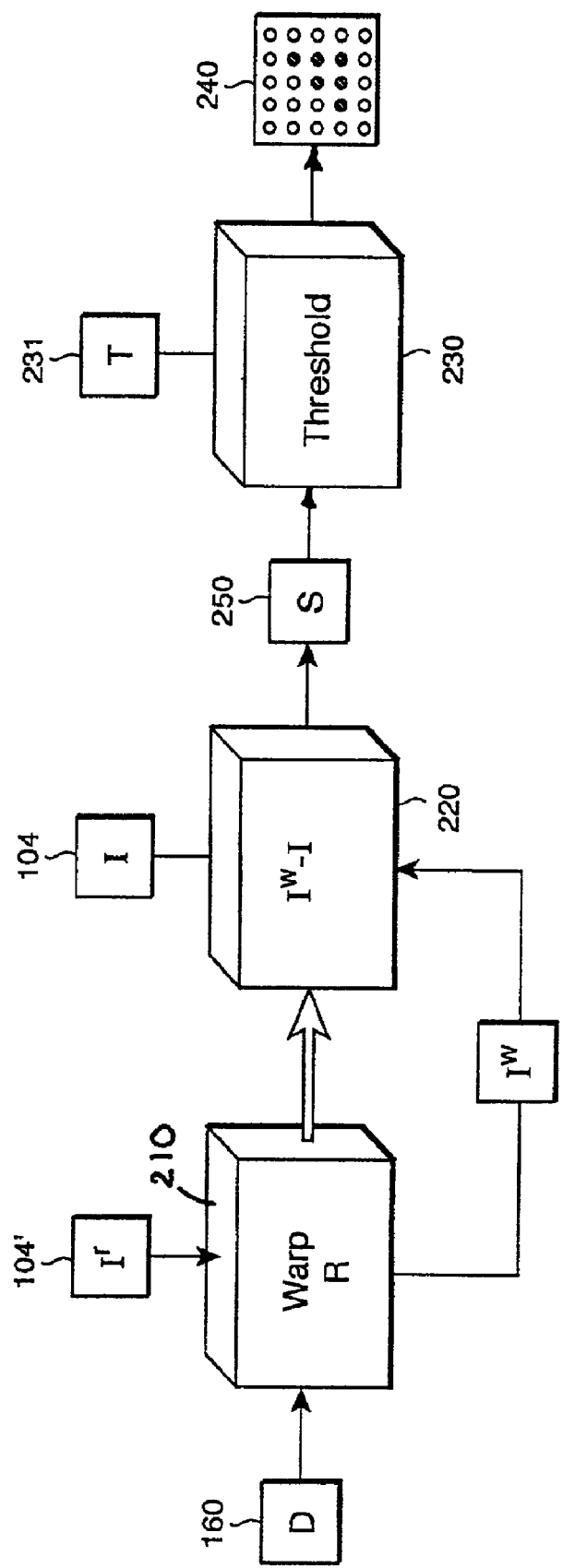
FIG. 2 is a flow diagram of the depth segmentation method according to the invention.

As shown in FIG. 2, our FDS method 200 works in exactly the opposite way. The FDS method 200 takes as input the image pair 104–104', and an approximated disparity set (D) 160. In one embodiment, the set 160 represents a smooth, continuous surface, which may be physical or virtual.

As used herein, the term "virtual surface" broadly means some arbitrary surface in the real world that is either a physical surface of a physical object, partially coincident with a physical surface, or some imaginary plane in empty space, not necessarily tangible, or only partially tangible. For example, a real door frame can define the an imaginary, intangible plane of an open entry way. Additionally, it should be noted that "foreground" objects include any object not part of the background, including objects behind the virtual background surface 103.

The disparity set 160 is used to determine the estimated depth disparities d(x, y) between pixels in one image to corresponding pixels in the other image of the pair. A set D of all such disparities for all pixels of a given image pair is $$D = \begin{bmatrix} . & . & . & . \\ d(x_1, y_1) & d(x_2, y_2) & ... & d(x_m, y_m) \\ . & . & . & . \end{bmatrix}. \tag{2}$$

The set D 160 is used to warp 210 every reference pixel of the reference image 104', rectifying it with respect to the corresponding pixel of the main image 104 such that scene locations at predetermined depths will map to identical image locations. The warp operation is given by:

$$I^{\prime\prime}(x, y) = I^r(x + D^x(x, y), y + D^y(x, y)), \tag{3}$$

where $D^x(x, y)$, and $D^y(x, y)$ are the x- and y- components of the disparity set D at the location (x, y).

After the reference image 104' is warped to correspond to the main image 104, a pixel-by-pixel subtraction 220 of the main image from the warped image yields a set S 250 of depth residual values indicating differences between the two images, there is one depth residual value for every pixel.

$$S=|I^w(x, y)-I(x, y)|. \tag{4}$$

In practice, some additional processing 230 is typically employed to remove noise and occlusion artifacts from the set 250. For example, all depth residuals smaller than a predetermined threshold T 131 may be set to zero, and all other values set to one. This thresholding procedure yields a binary segmentation mask 240. Each bit in the mask 240 is either a zero or a one. Zero bits correspond to background locations in the scene, and one values correspond to foreground locations. The binary segmentation mask can be used to efficiently segment and track one or more foreground objects in a scene observed by the stereo cameras 101–101'.

Disparity Set Determination

In order to construct the approximated disparity set 160, and to perform the object segmentation, we provide two alternative analytical methods. We can determine the disparity set directly using known point-correspondences and smoothness constraints of the virtual surface 103. Alternatively, we can determine the disparity set from intrinsic and extrinsic parameters of the stereo camera pair 101–101'. These two alternatives are now described in greater detail. In either case, we do not require the measurements of a complete continuous physical surface as in the prior art.

Direct Interpolation

Figure 3:
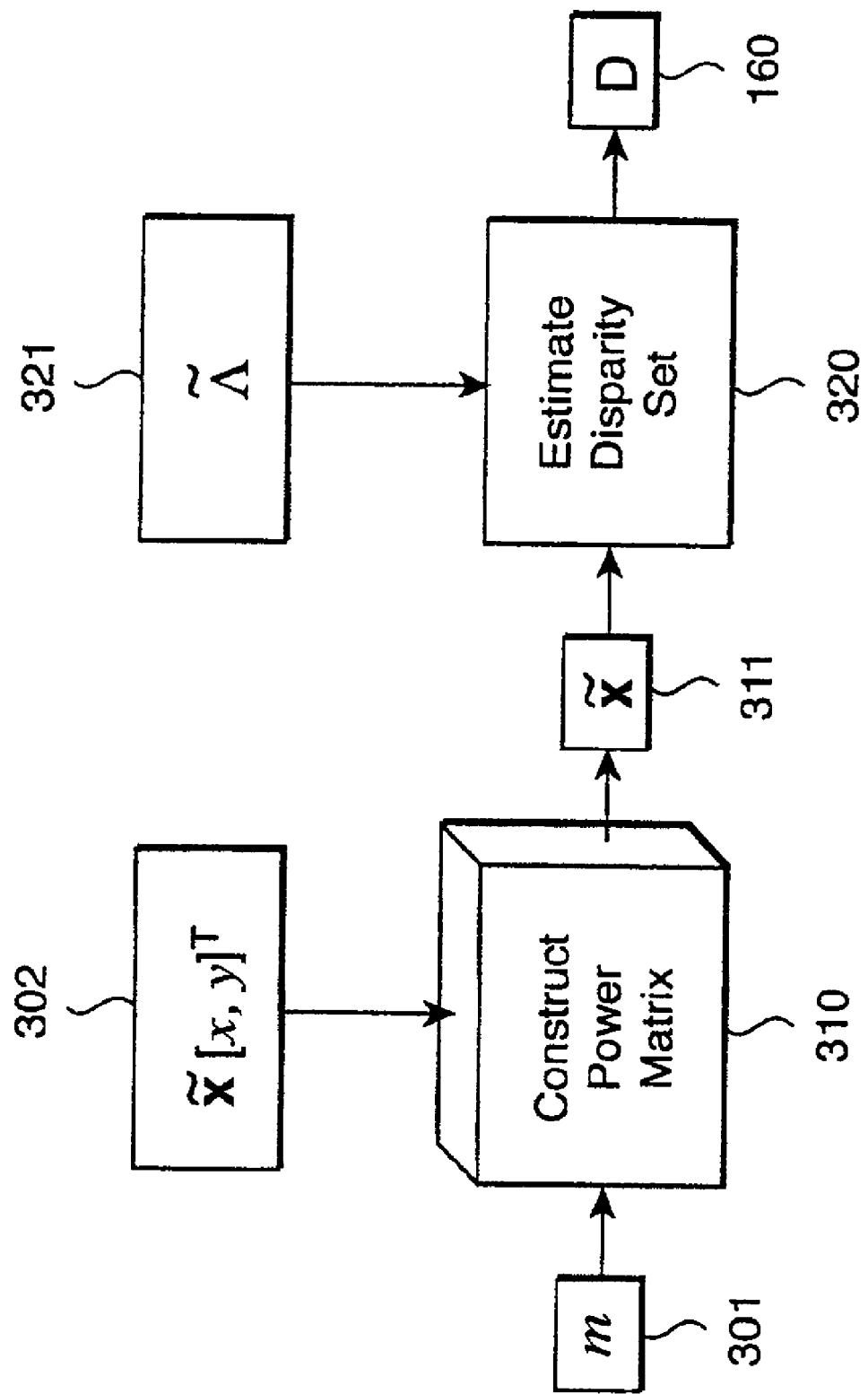
FIG. 3 is a flow diagram of a process for constructing an approximate disparity map according to the invention.

As shown in FIG. 3, we first acquire a sparse set m 301 of point correspondences from the cameras 101–101' in a calibration pair of images. In the case where the imaged surface is planar, e.g., when the object 103 is a chessboard, we can use the Intel Open Computer Vision Library chessboard finder functions to acquire these point correspondences by placing the chessboard at a desired depth plane, see "*Open Source Computer Vision Library Reference Manual*," Intel Corporation, 2001 (hereafter "Intel").

We use a smooth continuous approximation of a planar set m of point correspondences to determine the disparity set 160. For example, we construct the disparity set D by a polynomial interpolation of the sparse set of point correspondences. A particular disparity, d(x, y) is approximated by the following linear system:

$$d(x, y)=\Lambda \tilde{x}(x, y), \tag{5}$$

where $\Lambda$ is an unknown matrix of coefficients, and $\tilde{x}(x, y)$ is a power expansion of $x=[x, y]^T$ 302, for example, a power of two expansions $$\tilde{x}(x, y) = \begin{bmatrix} x^2 \\ y^2 \\ xy \\ x \\ y \\ 1 \end{bmatrix}, \tag{6}$$

however, other powers can also be used.

Given the sparse set of m, we construct a matrix of powers:

$$\tilde{X} = \begin{bmatrix} \cdot & \cdot & \cdot & \cdot \\ \tilde{x}(x_1, y_1) & \tilde{x}(x_2, y_2) & \ldots & \tilde{x}(x_m, y_m) \\ \cdot & \cdot & \cdot & \cdot \end{bmatrix}. \tag{7}$$

An estimate of $\Lambda$ 321 of the matrix coefficients $\Lambda$ can be recovered by a least squares operation:

$$\Lambda=(\tilde{X}\tilde{X}^T)^{-1}\tilde{X}^T D \tag{8}$$

Then, we apply 320 the linear system 321 of equation 5 to each image location to determine the approximated disparity set 160.

Figure 4B:
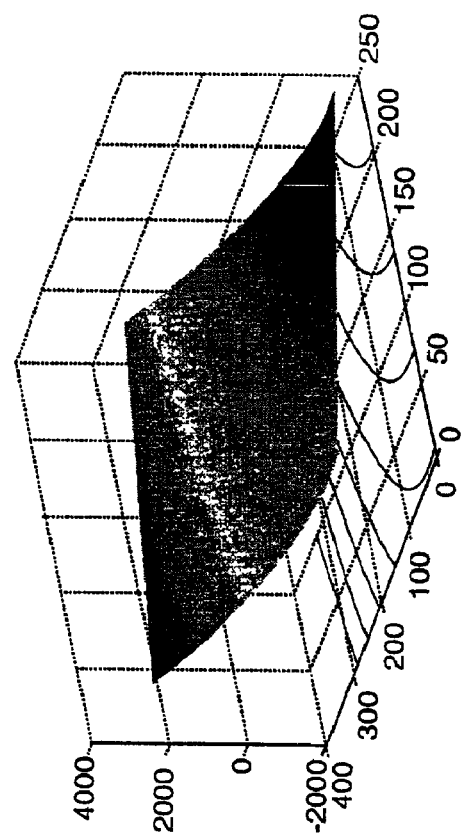
FIGS. 4a–b are graphs of the disparity map of FIG. 3.
Figure 4A:
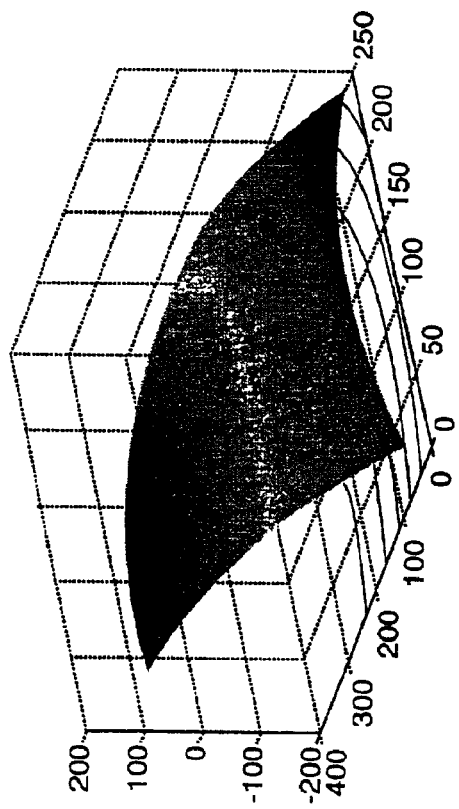

An example approximated disparity set for a planar surface is shown in FIGS. 4*a–b*. FIG. 4*a* shows the x displacements on the z-axis as a function of pixel location on the x-axis and y-axis, and FIG. 4*b* the corresponding y displacements.

Analytic Technique

One application of the method and system of our invention is for the visual detection of the relationship between a foreground object 150 and an analytical surface, real or virtual. The analytic form of the surface allows us to derive an analytic expression for the disparity in a fairly straightforward manner and thereby determine the disparity of any point on an arbitrary smooth surface.

We begin by introducing some notation used in the rest of this description. Let m be a coordinate vector of a point in the image, $\tilde{m}$ the point's homogeneous coordinates, M a vector of coordinates of the imaged location on the surface in a "world" coordinate system, i.e., the scene 102, and $\tilde{M}$ its homogeneous coordinates, respectively:

$$m = \begin{bmatrix} u \\ v \end{bmatrix} \tilde{m} = \begin{bmatrix} u \\ v \\ 1 \end{bmatrix}, \text{ and} \tag{9}$$

$$M = \begin{bmatrix} X \\ Y \\ g \end{bmatrix} \tilde{M} = \begin{bmatrix} X \\ Y \\ g \\ 1 \end{bmatrix}, \tag{10}$$

where g is some analytic function of X and Y in world coordinates, g(X, Y).

Widely available camera calibration techniques, which are not the focus of our invention, and, therefore, are not described in any detail, see, e.g., *Intel* and O. Faugeras & Q. Luong, *The Geometry of Multiple Images*, MIT Press 2001, typically make available sets of values: the intrinsic camera parameters A, a matrix R defining rotation, and a translation vector t that relates the physical coordinate system to the coordinate system at the optical center of the camera, O. Under these transformations, the following relation maps locations in the scene to the locations of the pixels in the images as:

$$\tilde{m}=A[R|t]\tilde{M} \tag{11}$$

In general, the Z components of M are determined by the value of some function of X and Y, i.e., Z=g(X, Y). Without loss of generality, one application of our approach is to construct the disparity map set 160 for a virtual plane which has a constant value of Z=C in the physical coordinate system.

Figure 5:
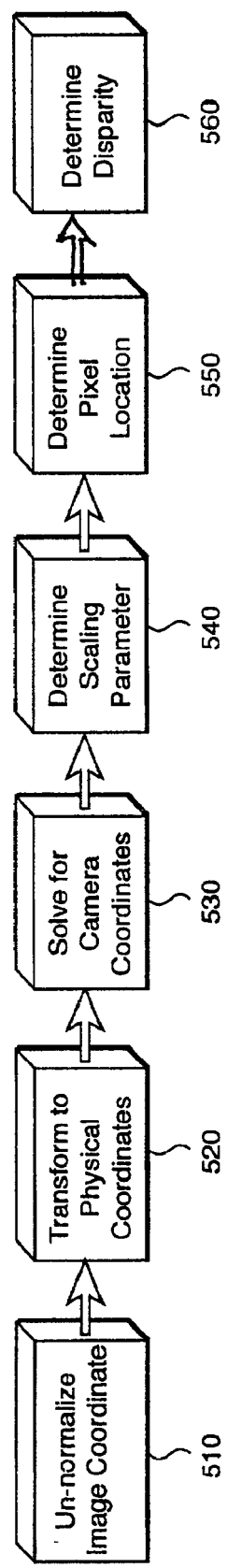
FIG. 5 is a flow diagram of a process for determining disparity according to the invention.

As shown in FIG. 5, our construction method proceeds in several steps. First, we transform the image coordinates of the image pixel 510 into the 3D camera coordinate system, $r_c$:

$$r_c = A^{-1}\tilde{m}. \quad (12)$$

Second, we proceed with a transformation 520 to the real-world physical coordinates, i.e., $r_c \rightarrow r_w$:

$$\begin{aligned} r_w &= R^{-1}(r_c - t) \\ &= R^{-1}[A^{-1}\tilde{m} - t] \\ &= (AR)^{-1}\tilde{m} - R^{-1}t. \end{aligned} \quad (13)$$

In order to determine the location of a point on the virtual surface that is imaged at location m, we invoke the surface constraint, i.e., we identify a location in a plane for which $Z = g(X, Y)$. From a parametric equation of a ray L passing from $O_w$, the optical center of the camera expressed in real-world coordinates, through $r_w$, the real-world location of an image point, we solve 530 for the disparity D as follows in equations 14 through 20:

$$L(s) = r_w + s(r_w - O_w), \quad (14)$$

where s is a distance scaling factor specifying the length of the ray L. The constant depth constraint results in the following equation:

$$L^z(s) = g(X,Y) = r_w^z + s(r_w^z - O_w^z), \quad (15)$$

where the superscript z denotes taking the Z component of the vector.

This allows us to solve 540 for the scale parameter s of a location where the ray L intersects a plane positioned at a distance $Z = g(X, Y)$ from the virtual background plane with a depth value of $Z=0$;

$$s_g = -\frac{g - r_w^z}{r_w^z - O_w^z}. \quad (16)$$

Noting that $O_w = -R^{-1}t$, we rewrite equation (16) explicitly to get the final form of the constraint on s:

$$s_g = -\frac{g + [R^{-1}t]_z}{[(AR)^{-1}\tilde{m}]_z}. \quad (17)$$

Therefore, a location of a point on the surface with depth $Z = g(X, Y)$ is determined by $$\begin{aligned} M_g &= r_w + s_g(r_w - O_w). \\ &= (AR)^{-1}[1 + s_g]\tilde{m} \end{aligned} \quad (18)$$

With the set of calibration parameters $A^r$, $R^r$, and $t^r$ of the reference camera 101', we now determine 550 the pixel location $m^r$ in the image 104 of the reference camera 101' by $$\tilde{m}_g^r = A^r[R^r|t^r]M_g. \quad (19)$$

Finally, the disparity for the pixel at location m in the main image 104 is determined 560 by $$D = m_g^r - m. \quad (20)$$

We perform this determination once for every pixel in the main image 104 in order to construct the disparity map 160.

Virtual Surface Margin and Virtual Volume

Figure 6:
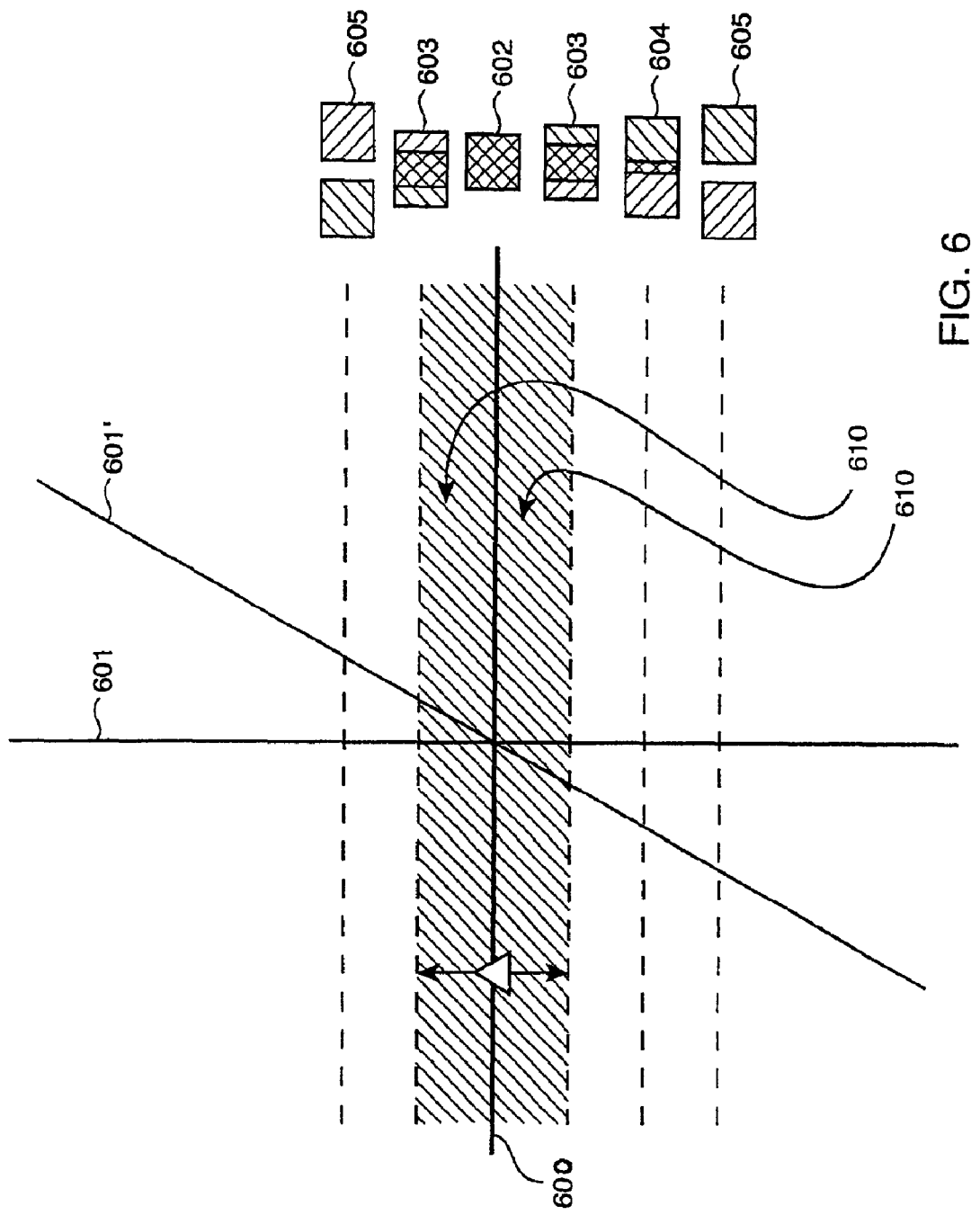
FIG. 6 is a diagram illustrating the relationship between a threshold, a residual, and a virtual surface margin.

FIG. 6 illustrates a real world situation that occurs for each pair of pixels in the stereo images 104–104' of FIG. 1 near a virtual surface 600. Here, 601 and 601' label a bundle of light rays imaged by any given pair of pixels in corresponding cameras 101 and 101' respectively, that are related through the disparity map 160.

If there is a real surface coincident with the virtual surface 600 that is defined by the disparity map 160, then a pair of pixels 602 images the exact same patch of the surface. This is a case where pixel measurements are substantially identical, and any residual only represents imaging noise.

For the case where the real surface is slightly nearer or farther from the cameras than the virtual surface 600, pairs of pixels 603 image slightly different parts of the surface, and the pixel measurements differ slightly. Consequently, the residual is greater than in the above case.

As the real surface moves farther from the virtual surface, less overlap exists in a pair 604, until the case where a pair of pixels 605 image completely different patches of the surface, and the residual is dominated by properties, e.g., luminance and chrominance, of the surface rather than its geometry.

Therefore, for any given threshold T 231, noise, geometry, and surface properties combine to form a margin Δ surrounding the virtual surface 600. This virtual surface margin Δ means that the virtual surface 600, in the real world as imaged by the camera, does not have zero thickness. In fact, the virtual "surface" is imaged as a thin slice or virtual volume 610 with a thickness equal to the margin Δ. This means that by measuring the residuals and bitmaps from a set of virtual surfaces, and combining these results with Boolean operations, it is possible to perform more complex volumetric depth segmentation operations.

Touch Application

The invention enables a number of practical applications. In one application, the system 100 can be used as a touch-system. In this case, the pointer 150 is a user's finger, or a stylus held by the user, and the system determines where on the surface the user is pointing at the object. The application of the process to the planar projection surface simplifies the calculations shown above, where the analytic form of the Z component of the imaged surface is $Z = g(X, Y) = C$, a constant. As stated above, the effective surface does not need be the actual physical surface, but could also be some off-set virtual surface above the physical surface. Therefore, as an advantage, the user does not actually need to make physical contact with a target object. Bringing the pointer's tip close to the surface is sufficient to indicate a touching. Consequently, the system can be used with objects that are sensitive to touching, or should not be touched at all, i.e., where prior-art mouse, conductive or capacitive touch technologies cannot or should not be used.

To further enhance the interactive operability, the background object can be illuminated by a dynamic projector. The fact that the foreground object is also illuminated, perhaps by a high contrast image, which would confuse prior art vision system, is of no consequence. Thus, the system of our invention can be used for games, modeling, and system control applications.

In addition, the system is easily adapted to any type of object without requiring the physical modification or re-engineering of the targeted object to be touch enabled. The system can also be used to detect "penetration" of a virtual surface, for example, the entry of a person through an open door way. Pointing the stereo cameras at the door or any other "empty" space allows the invention to detect foreground objects entering and leaving the space.

For these applications, the cameras 101 are first calibrated for the selected surface, as above. Then, we construct the disparity map for the surface by setting g(X, Y)=C=0 in equations (16) and (17), which induces a virtual plane that is coincident with the physical surface. In practice, a "virtual" surface somewhat near the physical surface can be marked as satisfying the constraint, even when the virtual surface is not strictly coincident with the physical surface. Areas that do not satisfy the constraint are unambiguously part of the foreground because they are not in or near the plane of the physical surface, and, obviously, cannot be behind it if the surface is solid and opaque.

The actual processing executes two instances of the FDS method 200. A first instance detects foreground objects at the physical surface, and the second instance detects objects just above the physical surface, i.e., g(X, Y)=C>0 in equations (16) and (17). The magnitude of the offset, that is, an offset threshold, can be determined by the specific application. For example, for a touch application C can be set to about the width of a finger, or slightly greater. When the top surface of the finger coincides with C, i.e., the offset virtual surface, the real physical surface must have been touched.

Any implementation would also benefit from color calibration of the cameras 101–101'. Being able to treat each color channel separately in the difference magnitude computation provides better discrimination, and therefore cleaner segmentation.

Our system performs depth segmentation maps in a substantially shorter time than approaches that use full stereo processing because the system takes advantage of stereo disparity constraints in the environment. In addition, the system can also recover a measure of physical proximity between observed objects that would otherwise be difficult to do using prior art techniques.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for identifying a location of an object in a physical scene with a stereo camera comprising:

identifying a virtual surface in the physical scene;
   constructing an approximate disparity set for the virtual surface;
   acquiring a main and a reference image of the scene with the stereo camera;
   warping the reference image according to the disparity set;
   subtracting pixels of the warped reference image from corresponding pixels of the main image to determine a depth residual of each pixel;
   acquiring a sparse set of point correspondences from a calibration pair of images;
   applying a polynomial interpolation to the sparse set of point correspondences to generate a smooth continuous approximate disparity set, wherein a particular disparity, d(x, y) is approximated by a linear system d(x, y)=$\Lambda \tilde{x}$(x, y), where $\Lambda$ is an unknown matrix of coefficients, and $\tilde{x}$(x, y) is a power expansion of x=[x, y]$^T$ $$\tilde{x}(x, y) = \begin{bmatrix} x^2 \\ y^2 \\ xy \\ x \\ y \\ 1 \end{bmatrix}; \text{ and}$$

identifying pixels having a substantially non-zero residual with a surface of the object not coincident with the virtual surface.

2. The method of claim 1 wherein the virtual surface has an associated margin to form a virtual volume near the virtual surface with a thickness equal to the margin.

3. The method of claim 2 further comprising:
   performing volumetric depth segmentation operations according to virtual volume.

4. The method of claim 1 wherein the virtual surface is an arbitrary surface defined in a space of the physical scene.

5. The method of claim 1 wherein the virtual surface is partially tangible and partially in a space of the scene.

6. The method of claim 1 further comprising:
   setting each depth residual less than a predetermined threshold to zero; and
   setting all other depth residuals to one to generate a binary segmentation mask for the object.

7. The method of claim 1 wherein the object is moving, and further comprising:
   tracking the moving object in a stereo video of the scene using the binary segmentation mask.

8. The method of claim 1 wherein the virtual surface is substantially planar and the approximated disparity set is obtained from intrinsic camera parameters of the stereo camera.

9. The method of claim 1 further comprising:
   determining a touching of the virtual surface by the object from the depth disparities.

10. The method of claim 1 further comprising:
    illuminating the scene and the object with a dynamic projector.

11. The method of claim 10 wherein the illumination includes a high contrast image.

12. The method of claim 1 further comprising:
    identifying a first virtual surface in the physical scene;
    identifying a second virtual surface in the physical scene offset from the first virtual surface by a constant distance;
    analytically constructing an approximate disparity set for the first virtual surface and the second virtual surface;
    warping the reference image according to the first disparity set;
    warping the reference image according to the second disparity set;
    subtracting each pixel of the first warped reference image from a corresponding pixel of the main image to determine a first depth residual of each pixel; and
    subtracting each pixel of the second reference image from a corresponding pixel of the main image to determine a second depth residual of each pixel; and
    comparing the first and second depth residuals to determine a touching of the virtual surface.

* * * * *